(12) United States Patent
Binding et al.

(10) Patent No.: US 8,452,286 B2
(45) Date of Patent: May 28, 2013

(54) WIRELESS COMMUNICATION

(75) Inventors: Carl Binding, Rueschlikon (CH); Stefan G Hild, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 12/127,116

(22) Filed: May 27, 2008

(65) Prior Publication Data
US 2008/0242300 A1 Oct. 2, 2008

Related U.S. Application Data

(63) Continuation of application No. 10/535,574, filed as application No. PCT/IB03/04854 on Oct. 30, 2003.

(30) Foreign Application Priority Data

Nov. 20, 2002 (EP) .................................. 02406003

(51) Int. Cl.
*H04W 4/00* (2009.01)
(52) U.S. Cl.
USPC ........................................ 455/436; 455/442
(58) Field of Classification Search
USPC ................................. 455/436, 442
See application file for complete search history.

(56) References Cited

U.S. PATENT DOCUMENTS

| 5,862,480 | A | 1/1999 | Wild | |
|---|---|---|---|---|
| 6,898,432 | B1* | 5/2005 | Jiang | 455/456.1 |
| 7,072,656 | B2* | 7/2006 | Willars et al. | 455/436 |
| 7,177,641 | B1* | 2/2007 | Miernik et al. | 455/435.1 |
| 7,613,457 | B2* | 11/2009 | Gao et al. | 455/444 |
| 2003/0119524 | A1* | 6/2003 | Carlsson | 455/456 |
| 2004/0203580 | A1* | 10/2004 | Engelhart | 455/406 |
| 2006/0199588 | A1* | 9/2006 | Gao et al. | 455/442 |

FOREIGN PATENT DOCUMENTS

| JP | 20020232930 | 9/1990 |
|---|---|---|
| JP | 2000-514267 | 10/2000 |
| JP | 2004-502363 | 1/2002 |
| JP | 2004-511988 | 4/2002 |
| JP | 2002-232930 | 8/2002 |
| JP | 2008001902 | 1/2008 |
| JP | 2008032179 | 2/2008 |
| WO | WO 98/27766 A3 | 6/1998 |
| WO | PCT/EP00/06094 | 1/2002 |
| WO | WO 02101902 A1 | 12/2002 |

* cited by examiner

*Primary Examiner* — Creighton Smith
(74) *Attorney, Agent, or Firm* — Michael J. Buchenhorner; Vazken Alexanian

(57) ABSTRACT

Access to wireless communication is disclosed, wherein a network control unit identifies availability of different communication networks for a communication device. The communication device is notified of a recommendation of identified communication networks. In response to this notification, the communication device initiates access to the recommended communication network for establishing a communication channel.

16 Claims, 4 Drawing Sheets

WIRELESS COMMUNICATION

This application is a continuation of, and claims priority to, U.S. application Ser. No. 10/535,574, filed on Nov. 30, 2005, which is a National Stage Entry of PCT/IB03/04854, filed on Oct. 30, 2003, which itself claims priority to EPO application 02406003.0 filed on Nov. 20, 2002.

TECHNICAL FIELD

The present invention generally relates to the field of wireless communication, and in particular to a method for managing network resources for wireless communication, to methods for establishing a channel for wireless communication, to corresponding computer program elements, to a communication network control unit, to an electronic communication device, and to a communication system.

BACKGROUND OF THE INVENTION

Different wireless communication systems are emerging based on global communication systems such as those based on satellites; national, cellular communication systems such as those based on GSM; and local wireless networks such as those based on 802.11-type technologies. Most of those networks are based on cells that are served through base stations or satellites, and most networks have built-in capabilities for communication devices to locate the nearest base station, and for hand-overs between adjacent cells within a network as the communication device is moved physically from one cell into another. This is referred to as "horizontal hand-overs". The described communication systems essentially differ in the size of their individual cells, the size of the entire network provided through the union of those cells, the characteristics of the communication links they provide, and to the degree to which horizontal hand-overs and other management functions are performed automatically or manually. In general, the larger the network the lower the provided communication bandwidth is, the higher the network delays and the higher the costs are.

Hilmat Schmundt in "Mit Superhandy ins Turbonetz", accessed Jul. 7, 2002 and retrieved from the Internet http://spiegel.de/spiegel/0,1518,druck-201029,00.html points out a need for a cellular phone that has access units both for GSM networks and for W-LAN networks.

Today, cell phones or data networking cards with hybrid GSM/802.11 network interfaces are available. The user can chose by manually activating a switch, which network to use for dialing in. For example, one such card is described on the Internet-Page http://www.nokia.com/phones/nokiad211/index.html, retrieved Nov. 18, 2002.

WO 01/22662 A1 discloses a dual mode subscriber unit for short range, high rate and long range, lower rate data communications. The low-range, high speed wireless communication path is a wireless LAN connection such as an IEEE 802.11-compliant wireless LAN and the long-range, low-speed wireless communication mode is a cellular CDMA-type connection. The communication unit is supposed to connect IEEE 802.11 W-LAN whenever possible. Determining whether the IEEE 802.11 mode is available is achieved by having the communication unit detect a beacon signal, or by having the communication unit transmit a probe request message and detect a probe response message in response to the probe request, indicating the presence or availability of the short-range, high-speed wireless communication path. Alternatively, the availability of short-range, high-speed wireless communication path can be detected by having the communication device detect activity on it.

Having the communication device determine which network to connect to by actively scanning available networks and searching for beacon signals or other network indicating signals is detrimental with regard to consumption of communication bandwidth and with regard to consumption of power.

It would therefore be desirable to provide a more intelligent selection of network resources for establishing a channel for wireless communication.

SUMMARY OF THE INVENTION

According to one aspect of the invention, there is provided a method for managing network resources for wireless communication, comprising steps being automatically executed by a network control unit: Identifying availability of different communication networks for a communication device, and notifying the communication device of a recommendation of identified communication networks.

In this approach it is the communication device which is guided by the network control unit and which is recommended a network to have a communication channel established.

The network control unit can be allocated to a particular network and can be responsible for managing the communication traffic on this particular network. The network control unit can be a central control unit for the entire network or be a control unit for a part of the network and then for example be a part of a base station serving a particular cell of the network. In order to give a recommendation to the communication device which one out of different available networks to use, the network control unit might have stored information on other networks or can get access to such information. The network control unit can also be responsible for managing different networks, since network providers are soon expected to emerge that keep control over different types of networks. Then, there might be one network control unit managing communication traffic on different networks at least for particular local areas of the respective networks. Networks can provide services for example for voice, data or other types of communication.

The proposed steps executed by the network control unit are automatically executed preferably by means of a processing unit being part of the network control unit.

The communication device can be a cell phone, can be a PDA (Personal Digital Assistant), can be a laptop computer, or any other preferably mobile electronic device with wireless communicating capabilities, related to data or voice.

In order to give the communication device advice which network to access, the network control unit is identifying availability of different communication networks for the communication device as a particular network has to be at least available in a sense of generally providing services in the device's location. This may preferably refer to the fact that coverage is physically provided by a particular network at the user's location, and/or preferably refer to the fact that the particular network may establish a communications link to the user, i.e. the network has the required resources in terms of processing capability, or network bandwidth, or similar, to establish such link. The results of the identification process are transmitted to the communication device. But not necessarily all results are subject to a message to the communication device. The network control unit might take a selection from the identified available networks and may notify the communication device only on one or more selected ones—these are recommended ones—out of the identified available networks. There might be different criteria applied to derive the recommended networks from the identified networks. There might be a number n of recommended networks with 0<=n<=m, and m being the amount of identified available networks. A recommendation of a network can basically be interpreted as binding for the communication device to connect to, or can be interpreted as suggestion to do so.

Networks are different when they provide different bandwidth, or use different carrier frequencies, or provide different levels of user access and access conditions to a particular user, or use different encoding or modulation techniques, or are managed or owned by different entities or organizations. In particular, networks are different when sizes of individual network cells are different. Examples of such different networks include GSM, W-LAN, UMTS networks or other networks.

Basically, the invention enables a communication device to "vertically handover" a communication channel, that is to say that devices can switch communications from one type of network to another or can establish communication on a recommended network, for example in order to increase communications bandwidth, to lower cost, or to optimize bandwidth utilization from the network operator's point of view. Basically, the network control unit is controlling this process, at least initiating. A network operator is provided with adequate means—that is basically the network control unit— to assign communication devices to the "right" network when more than one is available.

As now the communication device is guided by the network to perform a vertical hand-over, a need for active scanning by the device is eliminated, thereby saving communication bandwidth and reducing power consumption of the communication device. Furthermore, globalized optimization of network resources over all devices present within the diverse networks administered and operated through one single operator become possible. Device initiated hand-up respectively hand-down can remain a fall-back solution.

The invention also allows network operators now to build, own, and/or maintain different types of networks and provide "one-stop-shopping" for network connectivity on global, national, or local level.

In a preferred embodiment, the availability of different communication networks is checked by identifying communication networks that provide services in the device's location. In some instances, networks provide global coverage; such networks are, by definition, always available to the user regardless of the user's location. In some other instances, this may be achieved by determining the user's location by means of already established links within some network. The location has not to be defined as a very precise spot but can also be a geographical area of larger or very large size.

by determining a at least rough location of the communication device, and

A cell of a wireless network is typically defined by and including a base station that is capable of handling communication requests of communication devices located within a certain geographic area due to its range that covers this area. The device's location can preferably be inferred from the location of a base station that might currently serve the communication device. A network operator might provide lists VRL (Visitors Location Register) where a current location of all or many communication devices being registered for this network may be listed. Network control unit can also derive location information from this VRL. Alternatively or in addition to, the communication device can actively send its location, that may be detected by a GPS (Global Positioning System) which may be allocated to the communication device.

Once having the at least rough location of the device determined, communication networks covering the device's location can be identified. This is preferably achieved by means of a look-up table. Such look-up table may contain information, which networks are currently covering which locations or areas. Such look-up table might be stored and updated every time a significant change in network coverage is achieved by installing new base stations including antennas and other equipment for providing wireless connection services to areas not having been provided before. Such look-up table can also be generated online by requesting information from providers of other wireless networks.

Before recommending use of one or more specific networks to a communication device, access capability of the communication device to particular communication networks is preferably identified. Each communication device might be identified by an ID sent by the device or be requested by the network control unit. The ID itself might provide sufficient information since the ID might very precisely define the configuration or access capabilities of the device. In an alternative embodiment, singular access capabilities of the device are sent to the network control unit. This can in particular be advantageous for communication devices having slots for a variety of access cards, e.g. laptops that can be equipped with different types of PCMCIA cards of wireless interfaces.

This preferred embodiment helps to avoid exchange of dispensable information, e.g. recommending a certain network to the communication device, whereas the communication device is not prepared to access the recommended network due to missing hardware capabilities.

In a very much appreciated embodiment, the communication networks that cover the device's location and the networks that are accessible for the communication device both are identified. Accordingly, process of a vertical handover can be handled efficiently.

In another preferred embodiment, none, one or some out of the identified communication networks are selected for recommendation in a way that takes into account communication costs for the use of such networks. Only the network that provides the cheapest rates for a connection might be recommended to the device for continuing or establishing a communication channel on. There might also be recommended the two or three cheapest networks for an actual communication request. Networks might also be selected according to other prize/performance optimization models.

Preferably, the recommended ones among the identified networks might best consider the current load and for example show the smallest amount of traffic actually or in average. It is not only the user who might benefit from faster connections when communicating over such a recommended network but the network operator who achieves a well-balanced load over several networks.

In another embodiment, those networks are recommended that provide highest bandwidth.

Preferably, a customer profile is considered when selecting networks for recommendation to a communication device.

Two, more than two, or all of the before mentioned selection criteria can be considered when selecting networks out of identified ones for recommendation to a communication device.

The recommendation note of the network control unit might not only be sent to the communication device for information purposes but might preferably also be initiating a hand over process on the device for establishing a communication channel on the or one of the recommended networks. As a consequence, the network control unit shows at least partial control over the communication device in at least co-determining the network that the communication device is going to use for further communication. When the network control unit's recommendation is binding for the communication device, the network control unit receives full control over managing network capacities, loads, bandwidths, etc.

Triggering actions for starting the proposed method carried out by the network control unit might be manifold:

In a preferred embodiment, the identification of available networks is triggered by the network control unit. In this embodiment, the inventive method can be executed permanently or be triggered periodically or be triggered by one or more physical parameters characterizing one or more available networks like capacity that might be responsible for triggering the identification of available networks when for example the network currently used by the device is short of capacity. A periodical trigger is preferred when the network control unit is responsible for managing resources for several networks and the current load on the different networks is monitored permanently. After having investigated load data on different networks, some devices might centrally be caused to reconnect to other networks in order to balance load over the networks.

Every search for an available network can preferably also be initiated by the communication device itself. A particularly appreciated point of time can be a connection request emitted by the communication device. Since a connection request is a pointer to an increase of network load on whatever network in the future, this connection request preferably triggers the investigation of available network resources conducted by the network control unit.

Another appreciated point of time to start the identification process is when a physical movement of the communication device is detected. When the communication device is moved from one cell of a network into another cell of the same network, the process is preferably triggered, since the load balance in the networks covering the new cell might differ significantly from the load balance of networks covering the old cell and therefore load adjustments might become necessary.

In this embodiment, the device's location can be monitored by base stations respectively the network control unit even without having the communication device online or requesting a connection. The location information can be transmitted within the respective network and can be made available to the network control unit when this unit is not part of the base station. Therefore, also when it is up to the network control unit to trigger the method the respective device does not necessarily has to be online or active.

According to another aspect of the invention, a computer program element is provided which comprises computer program code which, when loaded in a processor unit of an electronic device, in particular a network control unit, configures the processor unit to perform a method as described above.

Another aspect of the invention covers a communication network control unit that is configured for executing a method as described above. Preferably, the network control unit comprises a network selection engine—preferably a processor unit—for performing the network identification and selection steps, and an interface to communicate the selected networks to the communication device.

A further aspect of the invention provides a method for establishing a channel for wireless communication, comprising receiving a notification from a network control unit, the notification indicating a recommendation of identified available communication networks for establishing the communication channel, and initiating access to a recommended communication network for establishing the communication channel in response to the notification.

This method is run on the communication device. The communication device does not necessarily has to maintain an active communication channel but may remain in a silent mode, the device being turned on but not being actively online.

The method implemented on the communication device gives a network control unit the chance to have communication channels directed to networks in a way that optimizes load balancing over the different networks, or that provides optimal bandwidth for a device's user purpose, or that respects a customer profile best, or that optimizes costs for the user.

In a preferred embodiment of the method, access to the communication network in response to the notification is initiated automatically. This gives full control to the network control unit over the communication device.

In another embodiment, access to the communication network is initiated in response to the notification and in response to a user confirmation. It is appreciated that the network control unit basically recommends a network but the user of the device has to confirm that this recommended network should be chosen for further communications. This embodiment is especially advantageous, when the notification received by the device comprises more than one recommended network. Then, the user can actively choose one of the recommended networks for establishing the communication channel.

In another preferred embodiment, access to one or more recommended networks is supported by the network control unit. The notification sent by the network control unit comprises an information block with access data that can be derived by the communication device and be used in order to access the recommended communication network. This eliminates the need for the communication device for providing memory for access data.

In another aspect of the invention, a computer program element is provided comprising computer program code which, when loaded in a processor unit of an communication device, configures the processor unit to perform a method as described above in connection with the communication device.

Further, there is provided an electronic communication device, comprising access units for different wireless networks, and comprising a control unit for having the corresponding access unit establish a communication channel on a particular one of the networks in response to a notification from a network control unit recommending this network.

In addition, there is provided a method for establishing a channel for wireless communication, comprising steps performed by a network control unit: Identifying availability of different communication networks for a communication device, and notifying the communication device of a recommendation of identified communication networks. And comprising steps performed by the communication device: Receiving the notification, and initiating access to a recommended communication network for establishing the communication channel in response to the notification.

According to another aspect of the invention, there is provided a communication system, comprising a first network, a second network, both for wireless communication, a communication device being capable of accessing at least the first and the second network, a network control unit being configured for identifying availability of communication networks for the communication device, and for notifying the communication device of a recommendation of identified communication networks. The communication device comprises a control unit for initiating access to a recommended network for establishing a communication channel in response to the notification.

Advantages of the methods for establishing a channel for wireless communication, of the corresponding computer program elements, of the communication network control unit, of the electronic communication device, and of the communication system, including their embodiments go along with the advantages of the initially described method for managing network resources for wireless communication and its embodiments.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

Different figures may contain identical references, representing elements with similar or uniform content.

DETAILED DESCRIPTION OF THE DRAWINGS

Figure 1:
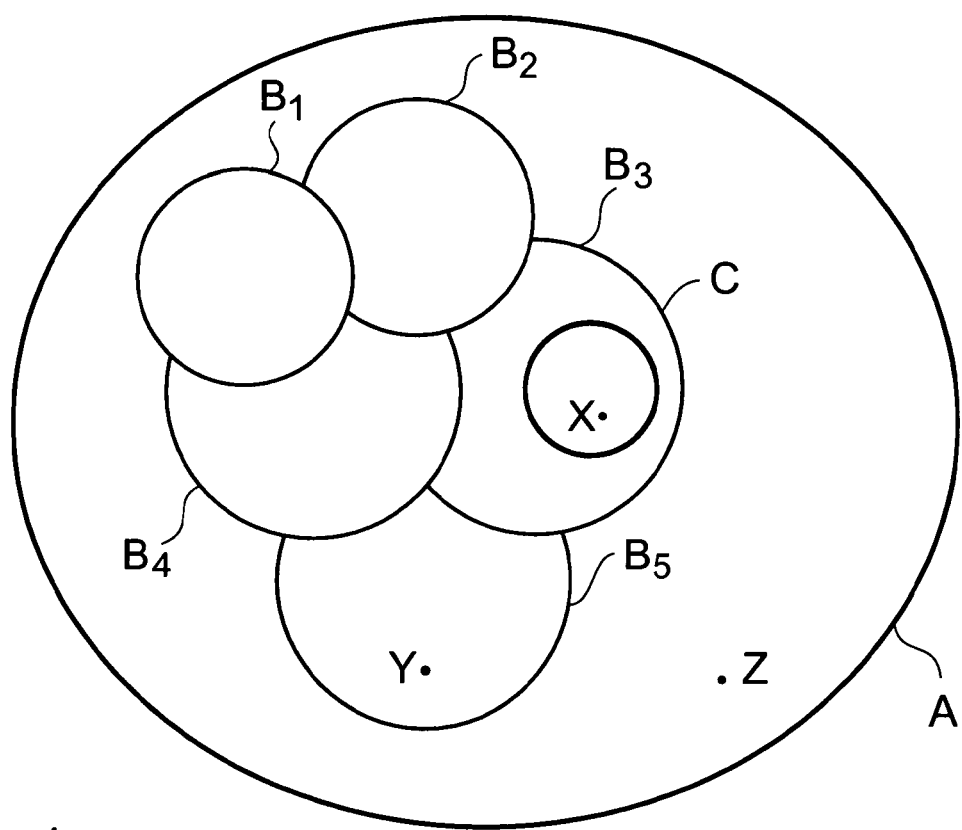
FIG. 1 a schematic top view of areas covered by different wireless networks.

FIG. 1 shows a schematic top view of geographical areas covered by different wireless networks. Area A is covered by a global communication systems based on satellites and may be covered in particular by one of the involved satellites. Areas B1-B5 are areas, each one covered by an allocated base station of a cellular GSM communication system, each area also representing a cell that is served by the base station. In addition, there is an area C existing, that is covered by a wireless local area network W-LAN based on the 802.11-type protocol. The networks essentially differ in the size of individual cells, the size of the entire network provided through the union of those cells, and the characteristics of the communication links they provide.

Users having a mobile communication device and being located in Z can only access the satellite based communication network, provided his device is equipped to. User having a mobile communication device and being located in Y can access the satellite based communication network or the GSM communication network, provided his device is equipped to access both of these networks. Users having a mobile communication device and being located in X can access the satellite based communication network, the GSM communication network and the W-LAN network provided his device is equipped to access every single one of these networks.

Whenever a user is communicating over the GSM network and is moving from location X to location Y, his communication is handed over "horizontally" from the base station serving area B3 to the base station serving area B5. This is achieved by built-in capabilities for communication devices to locate the nearest base station of a network.

Figure 2:
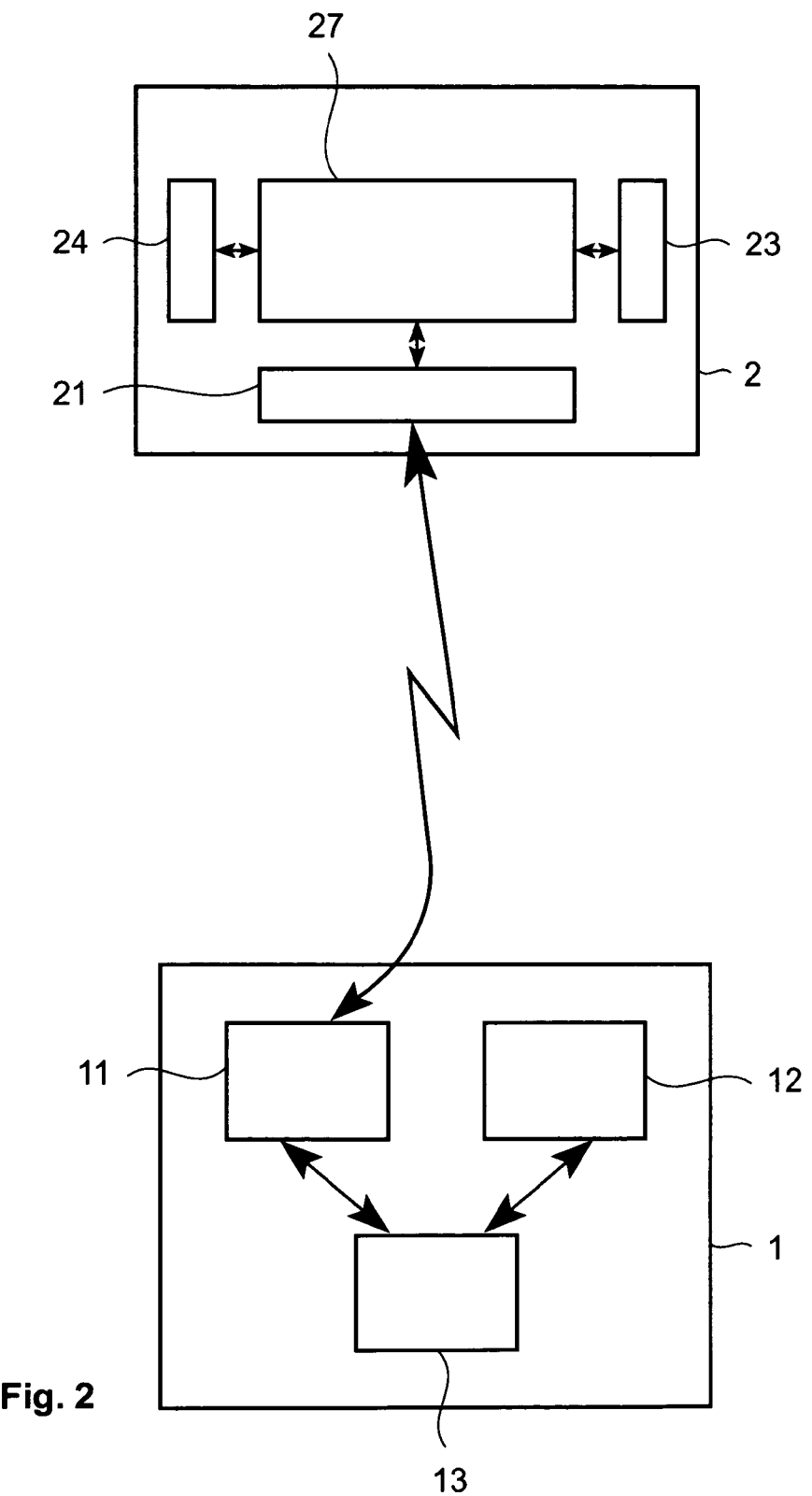
FIG. 2 a block diagram of a communication system according to an embodiment of the invention, FIG. 3 a flow chart of a method for managing network resources according to an embodiment of the invention, FIG. 4 a flow chart of a method for establishing a channel for wireless communication according to an embodiment of the invention.

FIG. 2 shows a block diagram of a communication system according to an embodiment of the invention. The communication system comprises a mobile communication device 1, for example a cell phone, and a network control unit 2.

Communication device 1 comprises among other things an access unit for GSM 11, an access unit for W-LAN 12, and a control unit 13. The network control unit 2 comprises among other things a communication interface 21, a processing unit 22, a look-up table 23, and a memory for customer profiles 24.

The communication device 1 is under control of the network control unit 2. The arrow indicates that there is a communication channel existing between the communication device 1 and the network control unit 2, in particular between the access unit for GSM 11 of the communication device 1 and the communication interface 21 of the network control unit 2. The network control unit 2 is organizing all communications over the GSM network.

The processing unit 22 runs a function that can be called "network selection engine". The network selection engine, as its input, has available the topological information of the GSM network and the 802.11 wireless LANs. This information can be derived from the look-up table 23, where this topological information is stored and up-dated. The network selection engine produces, as its output, a list of available LANs for each GSM cell. The network selection engine further identifies the ID of the communication device 1 for which a network selection process is to be executed. The ID might imply the information, to which different types of networks this particular communication device 1 has basically access to and thus is equipped with appropriate hardware. In addition to, the location of the device 1 is determined by the processing unit 22. The location may be inferred from the location of the base station that is currently serving that communication device 1, or through input from the communication device 1 itself. For example, the communication device 1 may detect its location using a GPS receiver on the device 1 and then report the result to the network control unit 2.

Having all this information collected, the network control unit 2 can identify the networks that basically can serve this particular device 1 in its current location. But not all these networks might be worth recommending to the device 1, since some of them might currently suffer from overload or other impacts. Hence, the network control unit 2 determines the current capabilities and load of each network: For example, each network may report, for the given location, the available network capacity that may be assigned to the communication device 1, the cost at which that capacity may be available, or other relevant factors. The required selection criteria might also be input from an overall network operator who is responsible for optimizing traffic on many different networks and thus might attempt to optimize network utilization, or from the communication device 1 itself, which might attempt to improve communication characteristics such as available bandwidth, or lower communication cost, etc. Another valuable input source is the customer profile memory 24, having stored customer profiles for many or all customers. Data from the customer profiled memory 24 may be fetched after the communication device 1 and thus an allocated customer is identified. According to such a customer profile, the customer may for example favor cost over bandwidth.

The network selection engine, respectively the processing unit 22 then evaluates the information presented and produces, as its output, the selected network that will be recommended to the communication device 1 via the communication interface 21. Alternatively, the network selection engine may also generate a list of alternative networks and may further identify the benefits of switching to one or the other, and notify the communication device 1 on this information.

The hand-over process is then initiated by signaling the recommended network to the device. The device can automatically initiate the hand-over process or require user confirmation to proceed with the hand-over process. This hand-over process is controlled by the device's control unit 13.

In the embodiment of FIG. 2, the hand-over process is initiated by transmitting, in the existing GSM "cell information" channel between network control unit 2 and communication device 1, the list of currently selectable LANs for the current cell. Devices like the one shown in FIG. 2 that receive this list can then switch to one of those LANs as they become available and they will continue to receive updated information of such LANs when they exist as the communication device 1 moves into new GSM cells. Note that the transmission of said cell information preferably only occurs when the communication device 1 is within a cell in which LANs are available; thus preserving network polling resources in GSM cells without LAN infrastructure as would be the case in a system where hand-downs are solely initiated by the mobile device without assistance from the network.

Figure 3:
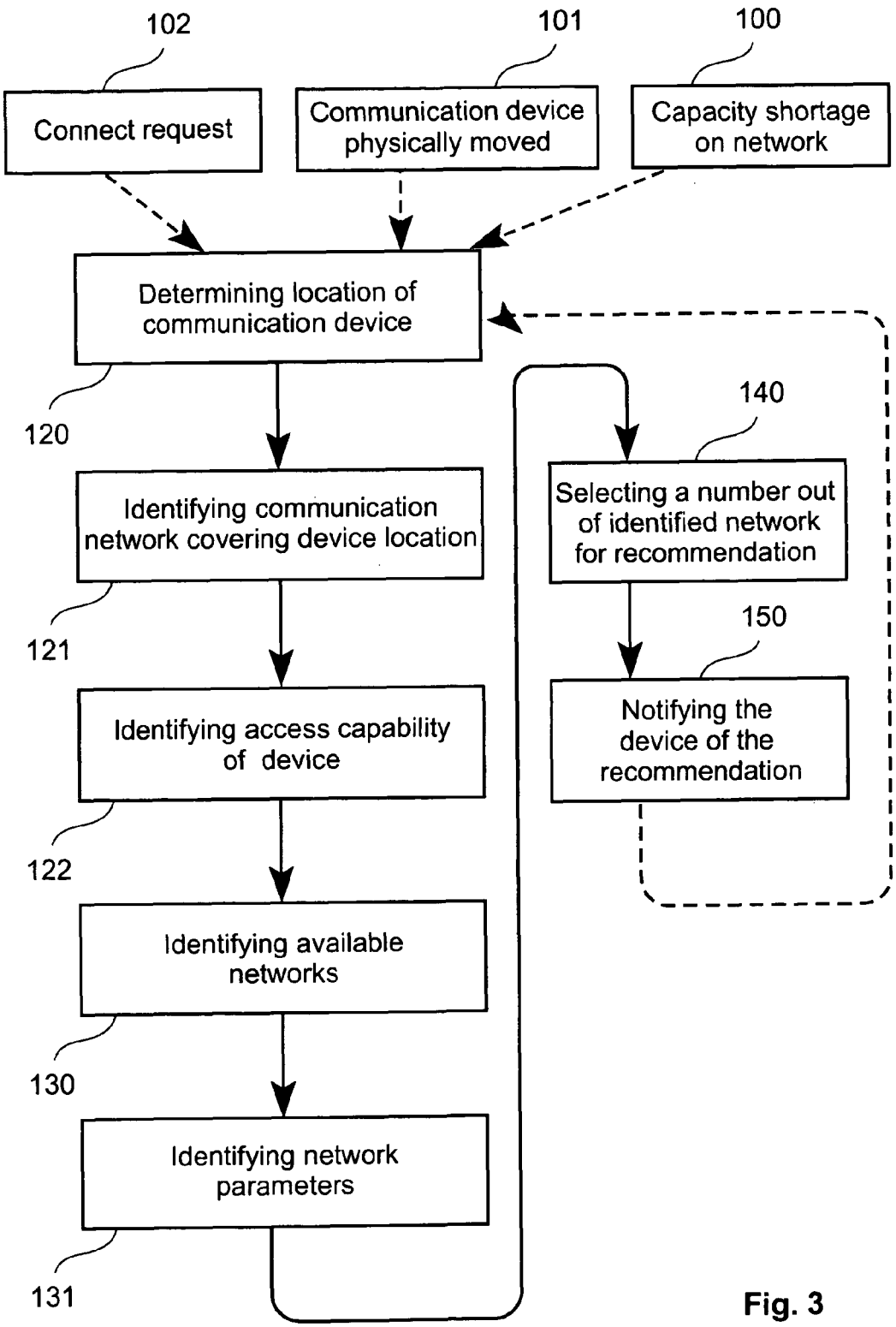

FIG. 3 shows a flow chart of a method for managing network resources according to an embodiment of the invention, The process that is automatically run by the network control unit may be triggered by the network control unit—also being part of a network operator which might trigger the network control unit—or the communication device respectively its user. However it may also be triggered periodically or when certain events occur. For example, the network resources managing process, also called network selection process, may be triggered by the network control unit when capacity shortages occur on one network (step 100). Or, the process may be triggered every time when physical movement of the communication device is detected (step 101, for example, when the communication device is being moved into a new cell. Or, the process may be triggered, when the communication device calls for a connect request (step 102). The alternatives are indicated with a dotted line.

In a first step 120, the network control unit collects information on the location of the device. The location may be inferred from the location of base station that is currently serving that communication devices, or through input from the communication device itself. For example, the communication device may detect its location using a GPS receiver on the device and then report the result to the network control unit.

In a second step 121, topological coverage information from the various networks are gathered in order to establish a list of available network alternatives for a given location.

In a third step 122, a—unique—identity of the communication device for which a network selection process is to be executed is determined. By means of the identity, access capability of this device to various networks can be determined.

The network control unit then evaluates the information presented and identifies networks that are generally available for this particular communication device—step 130.

In step 131, current capabilities and load of each identified network are identified by the network control unit. For example, each network may report, for the given location, the available network capacity that may be assigned to that communication device, the cost at which that capacity may be available, or other relevant factors. In addition, further selection criteria may be collected like customer profiles, and so on.

Steps 120-131 can be executed in different order.

According to the information gathered so far, one or more of the so far identified networks are selected for recommendation to the communication device, step 140. The communication device is then notified on these recommended networks by way of an electronic message. The network control unit may further identify the benefits of switching to one or the other of these identified networks and add this information to the note.

Figure 4:
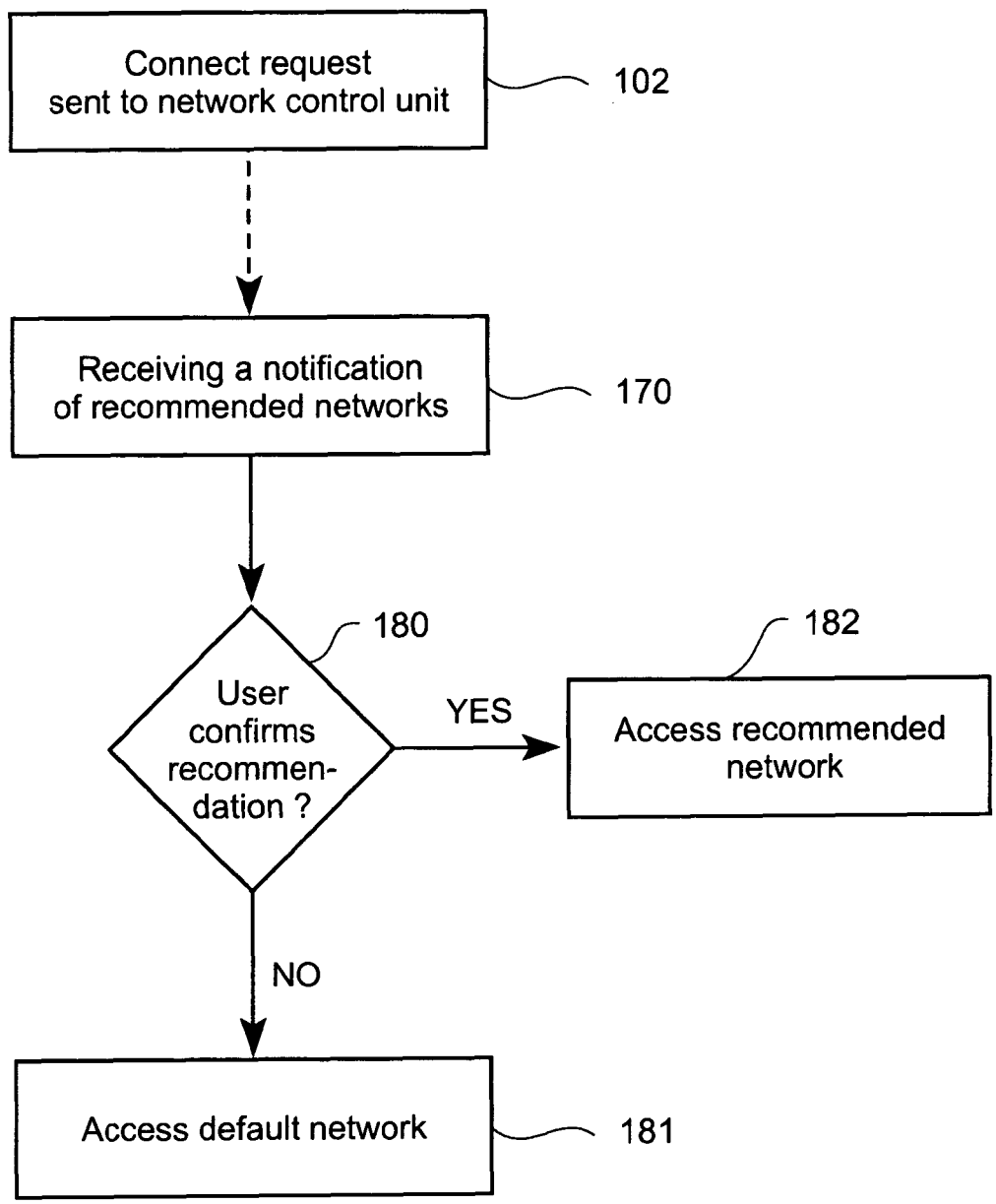

FIG. 4 shows a flow chart of a method for establishing a channel for wireless communication according to an embodiment of the invention. This method is executed on the communication device.

It is indicated in FIG. 4 that in this embodiment, the network control unit may have started the network resources management process when having received a connect request by the communication device—step 102.

A hand-over process is then initiated by signaling the identified network to the device. The device receives this notification in step 170 and asks the device's user by invoking a user interface for confirmation to establish a communication channel over the recommended network, step 180. In case of confirmation (YES), the control unit of the communication device initiates access to the recommended network, step 182. In case no confirmation is granted (NO), a default network may be accessed, step 181.

If more than one network alternative has been suggested by the network control unit, the control unit of the communication device may further run a selection process through which the user identifies the desired network change. The communication device may also execute that selection automatically, i.e. without user intervention based on configuration or on a first-come-first-served priority.

The network control unit may support accessing a recommended network transmitting to the client a new set of communication parameters in order to enable that client to execute the hand-over from one network into another. Preferably, the parameters that need to be transferred may include information such as:

Network information such as encoding schema, frequency schema, etc. This enables the communication device to establish a physical bearer link into the new network infrastructure.

Authentication information such as user names; passwords. This enables the communication device to logically access the network infrastructure securely.

Routing information such as the DNA address; key routes; key services; or simply the new PI address of the communication device that enables the communication device to access the PI network (or other types of networks) through the new network.

Expected communication characteristics such as the cost or expected bandwidth; this is particularly important if the network selection process has identified more than one network that the communication device might be able to be handed-over into. In this case, the communication device may now make a local decision as to which network it will actually switch into.

Finally, coverage information that may allow the communication device to estimate how much longer (or where) that new network will be (or remain) available.

What is claimed is:

1. A method for managing network resources for an inter-network vertical handover in a wireless communication, comprising steps being automatically executed by a network control unit in communication with, and under control of, a mobile wireless communication device:

receiving a prompt to select a second communication network for the inter-network vertical handover for the mobile wireless communication device operating within a first communication network, wherein the first and second communication networks are different types of communication networks, wherein the networks are different when they provide different levels of user access and access conditions to a particular user;

wherein the prompt comprises at least one element selected from a group consisting of:

a capacity shortage in one of the communication networks, physical movement of the mobile wireless communication device, a connect request initiated by the mobile wireless communication device, and a time interval;

identifying availability of different communication networks for the mobile wireless communication device, wherein availability is determined by referencing a look-up table located within the network control unit, said look-up table indicating the communication networks covering the device's location;

evaluating at least one of: current capability and load from among the identified available communication networks of each available communication network, communication costs for using the network, bandwidth, performance optimization, and the customer profile to determine the second communication network for vertical handover, wherein vertical handover requires optimizing bandwidth utilization from a network operator's point of view;

selecting the second communication network from among the different available communication networks, based on the evaluation, wherein networks are different when they provide different levels of user access and access conditions to a particular user; and notifying the communication device of a recommendation of identified communication networks which recommendation automatically initiates the vertical handover to such recommended network.

2. A method according to claim 1, comprising identifying access capability of the communication device to other communication networks.

3. A method according to claim 1, wherein communication networks are recommended according to communication costs.

4. A method according to claim 1, wherein communication networks are recommended according to a current load.

5. A method according to claim 1, wherein communication networks are recommended according to bandwidth properties.

6. A method according to claim 1, wherein communication networks are recommended according to a customer profile.

7. A method according to claim 1, wherein the vertical hand over process for establishing a communication channel on a recommended communication network is started after the communication device is notified.

8. A method according to claim 1, wherein the identification of available networks is triggered by the network control unit.

9. A method according to claim 1, wherein the identification of available networks is triggered periodically.

10. A method according to claim 1, wherein the identification of available networks is triggered when a physical movement of the communication device is detected.

11. A method according to claim 1, wherein the identification of available networks is triggered by a capacity shortage on at least one of the networks.

12. A computer program element comprising computer program code which, when loaded in a processor unit of an electronic device, configures the processor unit to perform a method as claimed in claim 1.

13. A communication network control unit, being configured for executing a method according to claim 1.

14. A program storage device readable by machine, tangibly embodying a program of instructions executable by the machine to perform method steps for managing network resources for wireless communication, said method steps comprising the steps of claim 1.

15. An electronic communication device, comprising:

access units for different wireless networks, a control unit in operative communication with a network control unit for having the corresponding access unit establish a communication channel in an inter-network vertical handover on a particular one of the networks in response to a notification from the network control unit recommending this network, which recommendation is binding for the communication device to connect to such recommended network, wherein vertical handover requires optimizing bandwidth utilization from a network operator's point of view, and wherein networks are different when they provide different levels of user access and access conditions to a particular user;

a communication channel between the electronic communication device and the network control unit;

wherein the network control unit establishes the communication channel by performing steps of:

receiving a prompt to select a second communication network for the inter-network vertical handover for the electronic communication device operating within a first communication network, wherein the first and second communication networks can be types of communication networks;

wherein the prompt comprises at least one element selected from a group consisting of: a capacity shortage in one of the communication networks, physical movement of the mobile wireless communication device, a connect request initiated by the mobile wireless communication device, and a time interval;

wherein the communication networks differ from each other with respect to at least one of:

carrier frequencies, levels of user access, encoding techniques, modulation techniques, ownership, and sizes of individual network;

receiving an identification of the wireless communication device, wherein said identification comprises a location of the mobile wireless communication device and access capability to the types of communication networks;

fetching a customer profile from a customer profile memory located in the network control unit, wherein said customer profile comprises a customer's preferences regarding cost and bandwidth;

identifying availability of the different communication networks for the mobile wireless communication device, wherein availability is determined by referencing a look-up table located within the network control unit, said look-up table indicating the communication networks covering the device's location;

evaluating at least one of: current capability and load from among the identified available communication networks of each available communication network, communication costs for using the network, bandwidth, performance optimization, and the customer profile to determine the second communication network for a vertical handover;

selecting the second communication network from among the different available communication networks, based on the evaluation; and notifying the mobile wireless communication device of the second communication network recommended for the vertical handover, which recommendation automatically initiates the handover to the recommended second communication network.

16. A computer program product comprising a computer usable medium having computer readable program code means embodied therein for causing functions of an electronic communication, the computer readable program code means in said computer program product comprising computer readable program code means for causing a computer to effect the functions of claim 15.

\* \* \* \* \*